United States Patent

[11] 3,632,350

[72] Inventor Orlando A. Battista
 Yardley, Pa.
[21] Appl. No. 12,503
[22] Filed Feb. 2, 1970
[45] Patented Jan. 4, 1972
[73] Assignee FMC Corporation
 New York, N.Y.
 Original application Oct. 17, 1966, Ser. No. 586,969, now abandoned, which is a continuation-in-part of application Ser. No. 436,371, Mar. 1, 1965, now abandoned. Divided and this application Feb. 2, 1970, Ser. No. 12,503

[54] FOOD COMPOSITIONS CONTAINING MICROCRYSTALLINE COLLAGEN
 6 Claims, No Drawings

[52] U.S. Cl. .................................................. 99/1,
 99/83, 99/107, 99/109, 99/114, 99/124, 99/134, 99/136,
 99/139, 99/144, 424/59, 424/177
[51] Int. Cl. ...................................................... A23l 1/00

[50] Field of Search ................................................. 99/1, 83,
 114, 124, 131, 134, 136, 139, 144

[56] References Cited
 UNITED STATES PATENTS
 3,073,702 1/1963 Keil .............................. 99/169
 3,293,237 12/1966 Wiegard ...................... 260/123.7

*Primary Examiner*—Raymond N. Jones
*Attorneys*—Thomas R. O'Malley and George F. Mueller ABSTRACT: Food compositions containing a new physical form of collagen. This form of collagen has been termed microcrystalline collagen and is a water-insoluble but water-dispersible ionizable, partial salt of collagen and is formed by treating undenatured collagen with dilute acid solutions having a pH between about 1.6 and 2.6. Mechanically disintegrating the treated collagen in aqueous liquids until at least 10 percent by weight has been reduced to a submicron size produces dispersions in the aqueous liquids which have an essentially constant viscosity. This new form of collagen is edible, bland in taste and odor and is indistinguishable in the food compositions.

FOOD COMPOSITIONS CONTAINING MICROCRYSTALLINE COLLAGEN

This application is a division of application Ser. No. 586,969, filed Oct. 17, 1966 now abandoned which is a continuation-in-part of my copending application Ser. No. 436,371, filed Mar. 1, 1965 now abandoned.

This invention relates to food compositions and products containing a new form of collagen. This new water-insoluble, microcrystalline colloidal form of collagen, because it is water insoluble and insoluble in aqueous solutions having a pH as low as 3–4, is capable of producing aqueous gels which are more stable on standing than presently known gels made from collagen derivatives, and produces superior end products.

Collagen is the principal building block of the hides and skins of most mammals, including man, and its principal source is hide substance. It also is the chief constituent of many other parts of mammals, such as tendons, intestinal walls, etc. In addition to its principal use —in the manufacture of leather—collagen is also widely used in the preparation of such materials as glue and gelatin. More recently, much study has been directed to the solubilization of collagen, and the reconstitution of the solubilized collagen as fibers for use as sutures, and as fibrous mats for various purposes.

The elementary basic molecular unit of collagen is tropocollagen, sometimes called procollagen. This unit has been isolated, and electron micrographs made, so that its structure is well understood. The macromolecules consist of three polypeptide chains coiled together in a long helix, about 10 to 15 A. units in diameter and about 3,000 A. units (0.3 micron) long. Tropocollagen is insoluble in neutral water, but is soluble in certain salt solutions and in dilute acid solutions having a pH of about 3 and lower. Much of the work done in the production of reconstituted collagen products has involved the conversion of fibrous collagen to acid-soluble tropocollagen usually employing relatively severe acid pretreatments whereby the collagen fibers and fibrils are reduced to tropocollagen molecules as above described followed by reprecipitation of the molecularly dispersed tropocollagen into a reconstituted form. A typical example of this procedure is disclosed in U.S. Pat. No. 3,157,524.

The next higher organized state in which collagen has heretofore been known is the collagen fibril, which consists of long, thin strands comprising thousands of individual tropocollagen units; the fibrils may be several hundred to a thousand angstrom units in diameter, and vary in length, generally being tons of microns long. In this form, the collagen is initially water insoluble, not only at the neutral point but also in acidified water having a pH of about 3 and lower. It is these fibrils which associate to form the macroscopic fibers present in natural substances and which fibers comprise many thousands of fibrils bonded together.

The art has long worked with these collagen fibers with the thought of using them for the formation of water-absorbent mats or sponges which could be used for various purposes. Originally, what was attempted was the breaking down of the fibers of the hide into their individual molecular units (tropocollagen and/or gelatin) by solubilizing them and then reconstituting them into batts. This process is extremely difficult and expensive.

The second type of approach is disclosed in U. S. Pat. No. 3,157,524. This patent discloses that batts or sponges may be formed by freezing an acidified collagen gel comprising substantial amounts of tropocollagen, after which the water is sublimed under high vacuum while maintaining the temperature below the freezing point. The patent points out that such products redissolve in water and attempts to neutralize the acid in the frozen product by aqueous alkaline solutions destroys the desired foamlike texture and produces a mat structure that loses much of its utility. The patentee overcomes this difficulty by freezing a gel of water-soluble, acid-treated collagen fibers, immersing the frozen mass in a circulating bath of a water-mincible solvent containing an alkaline agent to neutralize the acid whereby the collagen fibrils are dehydrated and coagulated and the salt formed by the neutralization is removed, and subsequently again drying the resultant collagen mass to form a spongelike mat which will resist dissolution in water.

The use of this method for neutralization is both slow and costly, and involves several processing steps which are expensive. Moreover, there is some loss of porosity in the sponges due to collapse in the organic solvent. Most importantly, the reconstituted collagen has lost its original morphology, and the natural bonds between the tropocollagen units present in the original fibrils are substantially weakened by the solubilization, regeneration and neutralization steps used.

The present invention provides a new form of collagen, which is a distinctly new physical state intermediate between that of swollen collagen fibers and the tropocollagen molecules disclosed in the above patent. This new physical form of collagen is microcrystalline and colloidal; it consists of bundles of aggregated tropocollagen units which vary in length up to just under 1 micron, and in diameter from about 25 angstrom units to some hundreds of angstrom units. Compositions comprising various forms of collagen, at least about 10 percent by weight of which comprises my new submicron microcrystalline colloidal collagen particles, and which are substantially free of tropocollagen and degraded derivatives thereof, produce viscosity-stable aqueous gels at low concentrations, of the order of one-half percent. This is possible because of the strict control of acid concentration in combination with appropriate mechanical disintegration to produce the microcrystalline, water-insoluble particles and to preclude true solution.

This is in sharp contrast to the type of aqueous gel formed by tropocollagen, and degraded forms of collagen such as gelatin and in sharp contrast to products made in accordance with the above patent, where the collagen has been solubilized and reprecipitated. The gels formed by the water-soluble and/or dilute acid-soluble forms of collagen thicken on standing to produce rubbery masses, so that their utility is sharply curtailed by this lack of stability. Moreover, gels may be produced in accordance with this invention utilizing much lower percentages of solids. At this stage, the particles are completely undenatured, there has been a minimal disruption of the original lateral bonding forces between the tropocollagen units comprising the original fibrils and many of the original lateral natural bonding forces remain substantially unchanged.

The water-insoluble microcrystalline colloidal collagen is prepared from any undenatured collagen in the natural state, either as pieces of original hide, gut, or other high-collagen source, but preferably with pieces dried under nondenaturing conditions and chopped up for easier handling. The undenatured collagen is treated very carefully under controlled conditions with very dilute acid solutions the pH of which is from about 1.6 to 2.6. Where the source material is wet, the proportion of water present must be taken into consideration in preparing the acid solution to be used in the treatment of the source material. The material is then mechanically disintegrated, in the presence of the dilute acid, until about 10 percent or more of the material is reduced to submicron size. It is not essential that all the source material be reduced to submicron size. The product becomes useful when about 10 percent has been so reduced, although optimum results are obtained at substantially higher concentrations of the submicron microcrystalline material.

Alternatively, the acid-treated, undenatured collagen may be dried without disintegration. Subsequently, in the production of various products, for example, water base paints, the dried, acid-treated collagen is subjected to disintegration during conventional mixing operations.

In producing my product, it is essential that the starting material be undenatured. Satisfactory raw materials from which the products of this invention have been prepared include fresh cowhides and calfhides, salted down cowhides, wet moosehide, and sun-dried pigskins, sheepskins and goatskins such as are conventionally used for making leather, as well as a special technical hide collagen prepared from hide splits and possessing a minimal reduced bacterial count (circa 200–4,000 bacteria per square inch). Similarly, hides and skins which have been freeze dried or dried by solvent displacement methods to maintain the collagen in a substantially undenatured state are equally satisfactory. In general, if a hide is in such condition that it can be wet back for use in tanning to produce satisfactory leather, it is satisfactory for producing microcrystalline colloidal collagen and the attendant stable dispersions. The preferred raw material, because of its wide availability and low cost, is obviously cowhide or technical grades of collagen prepared from cowhide and other animal hides.

In preparing the crude cowhides for use herein, it is obviously desirable to remove hair and flesh, so that they will now introduce impurities which must later be removed. I find it advantageous to use degrained hide especially when refined stable dispersions are desired since degraining removes some tightly bound impurities.

When operating next to an abbatoir, the hides may be processed fresh. However, it is desirable to use dry hides, for easier control of processing. Solvent extraction of the water in known fashion may be practiced; it is preferable to freeze dry the wet hides or finely comminuted wet hides, and sublime the water off under vacuum. This technique has marked advantages in ensuring uniformity of raw material as well as convenience and stability in storing and handling.

Undried split hides may also be stored at room temperature in a mixture of water and a water-miscible organic solvent, to preserve them from bacterial attack during storage and handling at room temperature. For example, a 25/75 ethyl alcohol/water medium or a 25/75 isopropyl alcohol/water medium may be used for such preservation of the hides at room temperature, depending on whether or not they are to be converted for internal or topical applications, respectively.

The hide substance is preferably chopped up before treatment for case handling. Preferably, it is ground to reasonable fineness, for example, in an Urschel mill, to ensure more uniform reaction, and to reduce the subsequent energy required in the ultimate comminution to submicron size. It should be noted that stable water-insoluble microcrystalline colloidal dispersions of untreated hide substance containing the required minimum amount of colloidal microcrystalline collagen particles cannot be obtained without the appropriate chemical pretreatment employing carefully controlled acid conditions in combination with the appropriate amount of mechanical disintegration.

For making microcrystalline colloidal collagen, an essential pretreatment is a thorough soaking of the hide substance with very dilute acid at the required pH. The concentration needed with any particular acid varies with its composition and degree of dissociation; the resultant product are more or less useful, depending on these factors.

With hydrochloric acid and a typical vacuum freeze-dried cowhide, it is essential that the pH of the treating solution not exceed about 2.6 to produce the microcrystalline colloidal collagen upon subsequent disintegration. Optimum results are attained with acid solutions having a pH of the order of 2 at 1 percent solids. Treatment with solutions having a pH of less than about 1.6 causes rapid degradation of molecular weight with an attendant buildup of acid-soluble tropocollngen and other degradation products as evidenced by a marked drop in apparent viscosity of the dispersed material upon disintegration in the aqueous liquid. The optimum pH of the treating solution will vary slightly depending upon the specific portion of the animal hide and the age of the animal from which the hide is obtained. In general, the optimum pH of the acid solution varies indirectly with the age of the animal; that is, for hides from older animals, the optimum pH of the acid solution is preferably in the lower portion of the pH range.

The action of the acid is threefold. First, the acid serves to cause a limited swelling of the fibers. Second, there is a limited hydrolysis of selective peptide linkages within the noncrystalline or amorphous regions of the collagen fibrils so that subsequent mechanical disintegration permits a ready fragmentation of the weakened morphology into microcrystalline particles having dimensions intermediate between those of tropocollagen and collagen fibrils. Third, a portion of the acid reacts with available primary amino groups of the collagen to form what may be termed a collagen hydrochloride salt which, of course, is ionized in the presence of water.

When the proportion of collagen source material is increased, the pH of the initial treating solution must be decreased because of the removal of a portion of the acid by reaction with the collagen. Thus, at a concentration of 7.5 percent collagen, for example, it is necessary to utilize a hydrochloric acid solution having an initial pH of about 1.52. On the other hand, if the pH of the solution has an initial pH of about 1.4, the collagen will be degraded excessively which is evidenced by a radical decrease in viscosity of the dispersion formed upon mechanical disintegration of the treated product.

After the acid treatment, the hide substance, with the acid distributed therethrough, is subjected to mechanical attrition in the presence of the aqueous liquid to reduce at least about 10 percent of the product to submicron size. In general, the preferred disintegrating equipment subjects the particles of treated collagen to high shear against each other, such as the Waring Blender and the Cowles Dissolver for low solids concentration, causing disruption and effective reduction in size of the subfibril microcrystalline aggregates. High shear can be imparted in other ways, as by extrusion through small orifices as by the use of a Rietz Extructor or by high-pressure filtration through a sintered plate particularly in the case of high (above 5 percent) solids concentrations, or other known techniques.

Preferably, the disintegration is continued well beyond the point where 10 percent of the product in submicron, preferably until 25 to 85 percent or more of the product has been reduced to colloidal size.

Hydrochloric acid has been referred to in the foregoing description and is also used in the examples merely because it is relatively inexpensive and allows ready flexibility and ease of control. Other acids, both inorganic and ionizable organic acids, such as, for example, sulfuric acid, hydrobromic acid, phosphoric acid, cyanoacetic acid, acetic acid, citric acid and lactic acid are satisfactory. Sulfuric acid, for example, is satisfactory, but control of the action is difficult. Citric acid may be substituted for hydrochloric acid with about equal results. "Kase of control" has reference to the ability to arrest the swelling and hydrolysis of the collagen fibers at that point whereby the insoluble colloidal material is formed and is retained while preventing the rapid degradation of the material to a water-soluble product.

Alternatively, the ground hide substance after treatment with the required acid solution may be dried under conditions that maintain the collagen in a substantially undenatured state and stored or shipped in the dried state. As a further alternative, the ground hide may be intimately mixed with a pulverized acid such as citric acid or tartaric acid. Prior to use in the production of a desired product, the dry material is mixed with the required amount of water, subjected to mechanical disintegration and then mixed with the other ingredients of the end product. Alternatively, the dry material is mixed with other ingredients of a desired product and with water and the mixture then subjected to a mechanical attrition step wherein the hide substance is attrited and all ingredients become intimately mixed. For example, in the use of the water-insoluble microcrystalline colloid substance as a binder in water-laid webs, the dry material may be mixed with water and mechanically disintegrated in a Cowles Dissolver and the resulting dispersion added to a pulp slurry before the sheeting operation. Alternatively, the dry material may be added to a pulp slurry and the mixture then subjected to mechanical disintegration, as in a Bauer Refiner, wherein the collagenous material is reduced to the required colloidal size before the sheeting operation.

Upon completion of the disintegration, the gels produced have a pH of from about 2.6 to 3.8, the specific pH being dependent upon the pH of the treating acid. It is essential that whatever the concentration of the collagen source material, the initial pH of the treating acid solution be such that upon mechanical disintegration of the treated collagen, the pH of the solution be within the range of from about 1.6 to about 2.6. The pH of the gels exhibiting optimum properties is between 3.0 and 3.4. For example, in the preparation of 1 percent gel, one part of finely ground, vacuum freeze-dried cowhide was treated with 100 parts of a hydrochloric acid solution having a pH of 2.25. After a 15 minute treatment in a Waring Blender, the gel had a pH of 3.25. A 2 percent gel was prepared in like manner and had a pH of 3.3. When 1 gram samples of mats prepared by freeze drying these gels were placed in 100 ml. of distilled water, the partial hydrochloride salt of collagen ionized without a disintegration of the mats and the pH of the water was lowered to a pH of 3.1.

For many uses, it is highly desirable to remove as much of the free fatty material present in the microcrystalline collagen acid dispersions. This removal may be achieved by adding cellulosic fibers in the form of highly bleached kraft wood pulp or microcrystalline colloidal cellulose to the dispersion with appropriate mixing to distribute uniformly the cellulosic material throughout the dispersion. Subsequent filtration of the dispersions, as by a conventional pressure filtration method utilizing layers of cellulosic fabric, cotton batting and the like mounted between suitable foraminous metal plates, results in a significant removal of the natural fatty materials present in the raw material. Alternative procedures to reduce such fatty materials to minimal levels are to extract the raw undried hides with organic liquids such as acetone, that will dissolve fatty materials, or to force the dispersions through cellulose paper or fabric filters under very high pressures. Such filtration steps furthermore help to remove extraneous small amounts of other impurities such as chips of hair and fleshy tissues that are quite undesirable in the finished products.

The invention may be illustrated by the examples which follows:

EXAMPLE 1

Ground, vacuum freeze-dried cowhide was soaked in an aqueous hydrochloric acid solution having a pH of 2.0 (2 grams ground, vacuum freeze-dried hide, 200 ml. dilute acid) for 15 minutes at room temperature, and then treated in a Waring Blender for 25 minutes at a temperature not higher than 25° C.; about 16 percent of the solids was of submicron size. The resulting gel had a pH of 3.0 and an apparent viscosity, measured at 25 C. on a HDT Brookfield viscosimeter with TB spindle, 10 r.p.m. of 42,900 centipoises.

Using an acid solution having a pH of 3.0 the product had a pH of 5.4, exhibited little bodying action (apparent viscosity under same conditions 4,800 c.p.s. and was replete with undispersed fibers. A stable dispersion was not formed even after prolonged mechanical disintegration. At a pH of 2.6, an apparent viscosity of about 30,000 c.p.s. was obtained. The viscosities of products rose to a peak when the pH of the treating acid solutions was in the pH range 2.0 to 2.3. and dropped off rapidly so that below a pH of 1.7 the viscosity was again below 30,000 c.p.s. apparent viscosity, reflecting degradation of the collagen and the formation of soluble lower molecular weight components. Using an aqueous hydrochloric acid solution having a pH of 1.3, a large proportion of the hide substance is degraded to very low molecular weight material. The disintegrated product had a pH of 1.5 and a viscosity of less than 100 c.p.s.

The quantity of acid as set forth in this example is based upon treatment at a 1 percent solids concentration or consistency. As discussed hereinabove, when the concentration of collagen solids is increased, corresponding increases in the quantity of acid will be required to achieve the preferred final pH range of the dispersions.

The amount of submicron material may be measured by sedimentation, after dilution of an aqueous gel to sufficiently low concentration so that the liquid is sufficiently thin to allow heavy particles to separate out. Specifically, a 1 percent gel was prepared as above and diluted by at least a factor of 10. This was allowed to stand 6 hours, and the percentage of solids in the top fifth of the material was measured. This material, being in Brownian motion, is colloidal; moreover, inspection under the microscope indicated it to be substantially all of submicron size. The percentage of submicron material in the total sample was calculated from the amount found in the top fifth. It is not essential that this procedure be followed precisely in measuring the content of submicron material. So long as microscopic examination of the top aliquot reveals the absence of substantially all material above 1 micron, the method may be used.

EXAMPLE 2

Another sample of a ground, vacuum freeze-dried cowhide was used to prepare 1 percent solids dispersions or gels by the same method as described in example 1 using hydrochloric acid solutions of different concentrations. The initial pH of each solution and the pH of the final dispersions were measured. The viscosities of the dispersions were determined as described in example 1 and visual observations were also noted. The results of these determinations were as follows:

TABLE 1

| Sample | Initial pH | Final ph | Viscosity cps. | Visual Observations |
|--------|-----------|----------|----------------|---------------------|
| A | 3.12 | 5.41 | 4,800 | undispersed fibers |
| B | 2.39 | 3.69 | 38,400 | highly viscous, transparent gel |
| C | 2.37 | 3.58 | 43,200 | highly viscous, transparent gel |
| D | 2.07 | 2.83 | 42,900 | highly viscous, transparent gel |
| E | 1.42 | 1.50 | 3,840 | low viscosity, opaque gel |
| F | 1.13 | 1.18 | 4,800 | low viscosity, opaque gel |
| G | 0.43 | 0.45 | 1,600 | low viscosity, opaque gel presence of oil phase |

The foregoing examples illustrate the criticality of the pH of the treating acid solution. These examples illustrate that where the initial pH of the acid solution exceeds the upper limit of about 2.6, the acid is insufficient to effect the threefold action discussed hereinabove and the attrited material contains a large quantity of fibers. Where the initial pH of the acid is below the lower limit of about 1.6, the quantity of acid effects the threefold action and in addition causes a degradation to low molecular weight acid-soluble products as evidenced by the extremely low viscosities of the dispersions.

The gels of this invention have one characteristic which differentiates them in kind from gels produced from tropocollagen gelatin: they exhibit only a minor increase in viscosity immediately after making, and the viscosity then remains stable or constant for days. Thus, the 1 percent gel of example 1 showed an apparent viscosity immediately after making of about 3,600 centipoises (HBT Brookfield, spindle TA, 100 r.p.m. 25° C.); within an hour it increased to 4,100 centipoises; and it remained at essentially that viscosity over a storage period of 6 days. This is in sharp contrast to the viscosity characteristics obtained with freely soluble tropocollagen and its degradation products like gelatin; gels made from these materials show progressive and very major increases in viscosity and in body over similar periods.

Below 0.5 percent concentration, the aqueous dispersions are too thin to be considered true gels. A 5 percent gel of the product of example 1 is extremely thick, but it can be extruded through an orifice at high pressure. Gels can be made with higher percentages of solids, but become difficult to handle with equipment other than high shear mixers such as Banbury mills.

Gels made in accordance with this invention have another notable characteristic. Their apparent viscosity is markedly susceptible to shear rate; the 1 percent gel of example 1 shows an apparent viscosity which ranges from about 400,000 centipoises at 0.5 r.p.m. to 3600 centipoises at 100 r.p.m. in a straight line when plotted on logarithmic coordinates. This reduction of apparent viscosity with increasing shear renders the gels particularly useful as a bodying agent in water base paints, to improve pigment suspension without loss of brushability. These gels exhibit striking non-Newtonian flow properties and thixotropic phenomena largely because of the dispersed rodlike nature of the constituent water-insoluble submicron microcrystalline colloidal particles. Further, when the apparent "intrinsic viscosition" of these gels are measured, values in excess of 9 have been obtained, reflecting a remarkably high apparent molecular weight, as compared with tropocollagen having values of only 1 or 2 measured in the same manner.

Another unique and distinguishing characteristic of the products of this invention is their behavior when dried as compared to prior art products. As disclosed in U.S. Pat. No. 3,157,524, the drying of the acid gels prepared in accordance with that method produces a product which when immersed in water reverts to a gel and is soluble in water. The patent teaches that in order to obtain a water-insoluble product it is necessary to neutralize the acid component of the gel and to remove the salt formed by the neutralization reaction. Products obtained by drying the gels made in accordance with the present invention are insoluble in water as described hereinbefore and as illustrated by the following example:

EXAMPLE 3

Twenty grams of chopped-up cowhide, free of water by freeze drying was placed in 1,980 ml. of a hydrochloric acid solution having a pH of 2 and treated at 25°–30° C. in a Cowles Dissolver, model IVG, for 15 minutes at 5,400 r.p.m. using a 4-inch pick blade. At the end of the attrition, the 1 percent gel of microcrystalline colloidal collagen was spread in a freeze-drying tray to form a layer one-eighth inch thick, and freeze-dried overnight (−40°to −**° C., vacuum 5 microns, heating cycle not exceeding 30° C. with condensation of sublimed water at 60° C.). The resultant product was a one-eighth inch mat which absorbed 65 times its own weight of water. The tensile strength of a dry test strip 1 inch in width was 3½ pounds, and the wet strength of a like test strip was quite low, but measurable.

Test samples of the mat can be repeatedly immersed in water, air dried and reimmersed in water without disintegrating. Upon immersing the mat in water, it swells but retains its integrity even when allowed to remain in the water over periods of months. This action of the dried product illustrated that the original macromolecular morphology of the microcrystalline colloidal particles has been retained to an extent sufficient to preclude disintegration to a true molecular dispersion of tropocollagen. In other words, the partial salt of collagen contains sufficient natural bonds that hold the original collagen molecules together in the collagen source material to render the product water insoluble in the presence of the bound acid.

The retention of a portion of the original bonds is also evident from a consideration of the bound acid in the dry products. When the amino acid residues of bovine corium collagen, for example, are considered, 1 gram of collagen contains approximately 0.78 millimole of primary amino groups available to react with an added acid. Actual analyses of products derived from microcrystalline colloidal collagen gels prepared with various acids showed a bound acid content varying from about 0.4 to about 0.7 millimole of acid (calculated an HCl per gram of collagen with an average bound acid content of about 0.58 millimole of acid per gram of collagen. Accordingly, it is concluded that certain of the amino groups are bound in the inner region of the microcrystalline particles and are unavailable to react with the acid.

As indicated above, other acids can be substituted for hydrochloric acid in the process described above, but concentrations of acids and ranges must be varied. Moreover, when plotting gel viscosity obtainable against hydrogen ion concentration in the acid solution, the peaks obtained with other acids may be sharper, indicating a much narrower useful concentration, indicating greater difficulty in preventing degradation and buildup of soluble tropocollagen. Sulfuric acid gives such a low sharp peak that its use in commercial operations is counterindicated; the peak is so narrow that control is much too difficult. Acetic acid, hydrobromic acid and cyanoacetic acid all give high peaks, but much narrower peaks than hydrochloric acid, so that greater care must be exercised in their use; even when they produce high viscosity gels, variations in localized concentration during treatment can produce sufficient localized conversion to tropocollagen to make dry products which lose their integrity when immersed in water. From a practical commercial viewpoint and in view of its low cost and the absence of complications in its use, hydrochloric acid is the treating agent of choice.

The optimum viscosity of the gels is obtained at different specific pH values of the gels when different acids are utilized an illustrated by the following example:

EXAMPLE 4

Gels containing 1 percent solids were prepared from ground, vacuum freeze-dried cowhide and acid solutions having different pH values as described in example 1. The initial pH of each solution and the pH of each final dispersion or gel were measured,. The viscosities of the dispersions were determined an described in example 1. The results of these determinations were as follows:

TABLE 2

| Acid | Initial pH | Final pH | Viscosity cps. |
|---|---|---|---|
| HCl | 3.12 | 5.41 | 4,800 |
|  | 2.39 | 3.69 | 38,400 |
|  | 2.37 | 3.58 | 43,200 |
|  | 2.07 | 2.83 | 42,900 |
|  | 1.42 | 1.50 | 3,840 |
| HBr | 3.00 | 4.60 | 4,000 |
|  | 2.38 | 3.67 | 44,300 |
|  | 2.06 | 2.57 | 28,800 |
|  | 1.35 | 1.42 | 7,200 |
| H$_2$SO$_4$ | 3.02 | 4.53 | 4,000 |
|  | 2.34 | 3.45 | 25,700 |
|  | 2.05 | 2.55 | 19,700 |
|  | 1.50 | 1.60 | 6,000 |
| CH$_3$COOH | 2.98 | 3.51 | 39,400 |
|  | 2.37 | 2.58 | 28,000 |
|  | 2.06 | 2.25 | 18,000 |
|  | 1.42 | 1.58 | 1,600 |
| CNCH$_2$COOH | 3.00 |  | 43,200 |
|  | 2.56 |  | — |
|  | 2.24 |  | 49,600 |
|  | 2.15 |  | 37,800 |

It will be noted from the foregoing data that the specific maximum viscosity of the gels varies with the different acids. When these and other data are plotted using log—log coordinates, it is found that, in general, maximum viscosities are obtained by the use of acid solutions having an initial pH of about 2.3 ± 0.1 and when the pH of the gels is about 3.2 ± 0.2.

Obviously, a product which yields such highly viscous gels at low concentrations suggests its use for a very wide range of purposes. As stated above, the properties of the gel render the product useful in water base paints. As disclosed and claimed in copending application Ser. No. 553,295, filed May 27, 1966, the product is particularly useful in forming coatings on a wide variety of bases. The coatings may be protective, decorative or may serve as a bonding agent, for example, as between fibers in a nonwoven fibrous web. The product is also useful in foodstuffs, and cosmetic and pharmaceutical preparations which are ingested or applied topically to humans and animals.

As disclosed and claimed in copending application Ser. No. 527,054, filed Feb. 14, 1966, the product has utility for the production of freeze-dried mats or sponges characterized by extremely high water and liquid absorbency rendering the mats or sponges particularly useful as wound dressings, surgical sponges and the like.

The freeze-dried mats are porous and find utility as filter elements. For example, a freeze-dried mat made from the dispersion of example 1 when used as a cigarette filter in comparison with conventional cellulose acetate filters retained a greater proportion of the tobacco smoke as determined by the color of the filters after smoking. The filters showed no shrinkage or other harmful effects from exposure to the smoke; the cigarettes drew at least as freely as the cigarettes having conventional cellulose acetate filters.

In addition to the above utilities, aqueous dispersions can e extruded to form water-insoluble fibers and films which can be used as is or the collagen may be cross linked by known techniques, as in tanning, to give improved products. The product can be dispersed with other fibers (e.g. cellulose fibers) and made into paper where it serves as an innocuous wet strength binder; the resultant paper shows marked increase in strength, wet or dry, as compared with untreated paper. Moreover, the products act to disperse such papermaking fibers as viscose rayon, which are normally difficult to disperse in a paper beater. Furthermore, as a thin coating on paper, the product provides a high gloss, flexible film with greaseproof properties.

The products of this invention may be derived from a variety of collagen source materials and it is obvious that the raw material will be selected according to the desired end use of the product. Similarly, the specific acid employed will be selected according to the end use of the product. For example, citric or lactic acids may be employed for edible, cosmetic and pharmaceutical uses whereas oxalic acid may be employed for industrial uses. Because the product is derived from a naturally occurring protein source and no toxic ingredient need be used in the preparation of the product, the product presents no problem of toxicity nor does it provoke allergies.

Microcrystalline colloidal collagen is particularly useful in a wide range of food products because of its properties. It is edible and nutritious, bland in both taste and odor, has very little, if any, color and free of textural defects which could adversely affect the taste and mouth feel of the food products. Gels have a very smooth and pleasant mouth feel and when present in foodstuffs becomes an indistinguishable part of the product.

Small proportions of microcrystalline colloidal collagen form highly viscous thixotropic gels thereby allowing improvements in various physical properties of foodstuffs such as eating quality, appearance and tactual, visual and taste textures. Thus, for example, liquid foodstuffs such as salad dressings may be thickened and insoluble ingredients may be maintained in a relatively uniform dispersed state by incorporation of small proportions of the microcrystalline colloidal collagen. This form of collagen may replace gelatin to produce such products which will have a substantially stable viscosity over a long period without a gradual increase in viscosity and setting into a gummy mass as occurs with gelatin. The product in particularly well suited as an inexpensive replacement for egg white and gelatin in various types of food products because it produces the same effects at appreciably lower concentrations.

The various properties also render this new form of collagen particularly satisfactory in a variety of cosmetic and pharmaceutical compositions or preparations. Certain pharmaceuticals and cosmetic compositions include organic-soluble substances and are used in liquid forms. An disclosed in copending application Ser. No. 499,077, filed Oct. 20, 1965, now U. S. Pat. No. 3,393,080, issued July 16, 1968, stable microcrystalline colloidal collagen gels may be formed in aqueous liquids consisting essentially of water and up to about 65 percent, by weight of the liquid, of water-miscible organic solvents such as alcohols, for example, methanol, ethanol, isopropanol and n-propanol; cyclic alcohols, for example, tetrahydrofurfuryl alcohol and furfuryl alcohol; ethers, for example, dioxane, tetrahydrofurane; and ketones, for example, acetone and methylethyl ketone. Accordingly, liquid or flowable and paste or ointment classes of compositions may be produced wherein a cosmetic or pharmaceutical ingredient is dissolved in the liquid phase in which the microcrystalline colloidal collagen with or without other insoluble ingredients is dispersed.

Microcrystalline colloidal collagen is useful in the preparation of meat products such as sausage and meat loaf products. The gel may be used to control the texture, juiciness and organoleptic characteristics and is particularly adapted to effect a uniform distribution of seasoning ingredients. The seasoning ingredients are dissolved and/or dispersed in the gel and the gel then used in preparing the meat emulsion for stuffing into casings or in preparing the meat loaf.

Dessert-type food products illustrating the use of microcrystalline colloidal collagen are as follows:

EXAMPLE 5

A 1 percent aqueous dispersion of microcrystalline colloidal collagen (ground purified hide collagen-citric acid) was heated to about 40° C. and then beaten with an ordinary household-type beater (Mixmaster) at high speed for about 5 minutes to a fluffy, foamlike consistency. The beaten foam was spread over a pie and browned in an oven at 375° F. for 10 minutes. The resulting meringue resembled the ordinary egg-white meringue.

EXAMPLE 6

A 2 percent aqueous dispersion of microcrystalline collagen was prepared containing sugar, flavoring and an edible coloring dye. The product resembled a conventional gelatin dessert product but did not set up to a rubbery texture on prolonged storage.

EXAMPLE 7

A pudding mix was prepared by thoroughly mixing the following ingredients:

|  | Parts by Weight |
|---|---|
| Cane sugar (finely ground) | 67.25 |
| Pregelatinized potato starch | 25.00 |
| Vanilla flavor | 2.00 |
| Salt | 2.00 |
| Sodium acid pyrophosphate | 1.00 |
| Dibasic sodium phosphate | 2.00 |
| Microcrystalline collagen | 0.75 |

The microcrystalline collagen consisted of finely ground hide collagen which had been treated with lactic acid and dried. To prepare the pudding, 4 oz. of the above mix were mixed with 2 cups of fresh milk and the mixture then beaten in a Waring Blender for 2 minutes. The liquid mass was then poured into molds and allowed to set. The product resembled conventional household type puddings. In a similar manner, various mixtures may be prepared for use as pie fillings.

EXAMPLE 8

A marshmallowlike candy product was prepared by adding 5 oz. of finely ground hide collagen and 1 oz. of citric acid to 3 pints of hot water and subjecting the mixture to beating in a Waring Blender for 10 minutes. A syrup was formed by dissolving 6 lbs. of granulated sugar and 3 lbs. of glucose in hot water and heating to a boiling temperature (about 240° F.). As soon as this temperature was attained, the syrup was added to the microcrystalline collagen dispersion and the mass thoroughly mixed. During the mixing operation, vanilla was added to impart a desired taste. The mixture was then poured onto a powdered starch covered pan, spread out evenly and powdered cornstarch spread over the layer. After standing overnight, the gelled layer was cut into strips about 1 inch wide and 1½ inch long and the strips rolled in powdered sugar. The product resembled conventional products normally made with gelatin.

EXAMPLE 9

An ice cream product was prepared containing

| | |
|---|---|
| Sugar | 4 lb. |
| Milk | 5 pt. |
| Cream | 4 pt. |
| Condensed milk | 1.2 gal. |
| Microcrystalline collagen (as per example 7) | 0.5 oz. |

The sugar was dissolved in the milk and the cream and condensed milk then added and the mass was thoroughly mixed. Sufficient vanilla was added to impart the desired flavor and the ground collagen-lactic acid premix added and the mass was then thoroughly beaten before placing in containers. The containers were then placed in a freezer. The resulting product had a very smooth, semigloss texture and resembled conventional ice cream products. The microcrystalline collagen reduced ice crystal growth and stabilized the product against "heat shock".

EXAMPLE 10

A mayonnaise-type salad dressing was prepared by preparing a 1½ percent dispersion of microcrystalline colloidal collagen (ground hide collagen—lactic acid) in water, A small amount of an edible surfactant was added. A mixture of one-half cup of corn oil, 1 tsp. of vinegar and one-eighth tsp. of salt was then mixed with 1 cup of the 3 dispersion. The mass was then churned in a Waring Blender for about 5 minutes. The product resembled conventional-type mayonnaise in its smooth texture, flavor, appearance and consistency. The product retained its properties over a long storage period.

EXAMPLE 11

Dry soup cubes were formed by first preparing a microcrystalline colloidal collagen powder. Hide collagen was treated with a lactic acid solution having a pH of about 2.3 and after attriting freeze drying the dispersion. The dried material after attriting freeze drying the dispersion. The dried material was finely ground and then thoroughly mixed with the following ingredients:

| | |
|---|---|
| Celery salt | 1 oz. |
| Salt | 4 lb. 13 oz. |
| Soup flavoring | 1 lb. 9 oz. |
| Edible tallow | 2 oz. |
| Microcrystalline collagen | 2 oz. |

The grandular mixture was then pressed into ½-inch cubes. The cubes when placed in hot water readily disintegrated and formed a uniform dispersion of the insoluble ingredients.

Obviously, the mixture may be packaged in granular form, if desired. The ingredients may be varied depending upon the desired soup, for example, chopped, dehydrated vegetables may be added and monosodium glutamate included and the edible fat eliminated.

EXAMPLE 12

A so-called snack item in chip form was prepared from the following ingredients:

| | |
|---|---|
| Cracker meal | 125 pt. |
| Wheat flour | 85 pt. |
| Sunflower meal | 80 pt. |
| Microcrystalline collagen | 3 pt. |
| Onion salt | 2 pt. |
| Celery salt | 1 pt. |
| Water | 100 pt. |

The microcrystalline collagen was the same as used in example 10. The dry ingredients were mixed and water gradually added to form thin doughlike mix. The mix was then extruded as a ribbon, cut into lengths and fried in deep fat at about 375° F. until they were light brown in color. The fried chips were allowed to drain free of the fat and salted with an antioxidant salt.

Microcrystalline colloidal collagen is highly satisfactory in a wide range of pharmaceutical and cosmetic compositions or preparations, as stated above. It is particularly advantageous in liquid, paste and cream-type compositions because of the ability to form gels at low concentrations and the ability to maintain insoluble ingredients in a stable dispersed state. It has a high affinity or sorptive power for oleaginous substances and will function as a means for dispersing the oleaginous substances in aqueous liquids. In lotion, emulsion, cream and ointment types of compositions that conventionally include oily, fatty or waxy (oleaginous) ingredients, the stability of the composition may be improved by the addition of a small proportion of the colloidal collagen. Microcrystalline colloidal collagen may be utilized to replace part or all of the oleaginous ingredient. The ability to reduce or eliminate oleaginous ingredients in these types of compositions reduces the greasiness of the products. Accordingly, after the composition is spread over the skin of the user and allowed to dry, the coatings have a lower soiling tendency and the coatings are not readily transferred by contact with clothing, bandages, etc.

This new form of collagen has excellent compressibility characteristics and, when formed under compression, provides a coherent structure and, accordingly, finds value in the manufacture of tablets and compressed shapes. It may be used to replace in whole or in part conventional substances such as starch, sugar and binding agents such as gelating, syrups and various gums. One of the characteristics of the tablets in the dust-free character as compared to conventional tablets. Also, in power composition, this form of collagen may replace, in whole or in part, opacifying agents (clay, magnesia, zinc oxide, etc. slip materials (talc, metal stearates, etc.) adherent materials (clay, stearates, etc.) and absorbents (chalk, kaolin, etc.).

The microcrystalline colloidal collagen is of particular advantage in the preparation of hair sprays. It is well recognized that polyvinyl pyrolidone which is a common ingredient in commercial hair sprays is proving to be harmful because in use, some of the hair spray is inhaled by the users. The polyvinyl pyrolidone collects in the lymph glands and cannot be decomposed in the human body. the microcrystalline colloidal collagen, The the other hand, is entirely harmless.

In shaving creams, soaps, bubble bath compositions, etc. this form of collagen has utility because of its ability to strengthen and stabilize the lather or foam. It appears to function to strengthen the gas enclosing walls and prevent them from readily breaking down.

Although this form of collagen will form compositions with excellent adherence when applied to the skin of the user because of the excellent adherence when applied to the skin of the user because of the excellent gel and dispersion forming characteristics, the coatings or films which are formed are readily removed by the application of water. Although this form of collagen is not soluble in water, it readily forms the dispersions and can be easily removed. Similarly, although the tablets which may be formed by compressing this form of collagen with the other ingredients of a pharmaceutical or cosmetic composition have excellent cohesive characteristics, the tablets readily disintegrate in water or in the stomach fluids. The rate of disintegration may be varied by varying the pressures used in tableting and by the relative proportions of the collagen and other ingredients.

The term "pharmaceutical" is intended to refer to drugs as defined in the United States Federal Food, Drug and Cosmetic Act. In view of its inertness, microcrystalline colloidal collagen may be associated with large numbers of drugs, such as analgesics, antiinfectives, antiacid preparations, antiulcer drugs, antihistamines, hypnotics, sedatives, vitamins, stomachics, astringents, fungicides, local antiseptics, etc.

The term "cosmetic" is intended to include all types of products which are applied in any manner directly to the person for the purpose of cleansing or embellishment and is intended to also include toilet soaps, shaving soaps and creams as well as deodorants, depilatories, and suntan and sunscreen preparations. The microcrystalline colloidal collagen in cosmetics may be used in addition to or as a replacement for at least part of conventional ingredients such as lanolin, beeswax, oleic acid, spermaceti, almond oil, castor oil, tragacanth gum, clay, magnesia, talc, metal stearates, chalk, magnesium carbonate, zinc stearte, kaolin, etc.

Obviously, a great number of specific examples could be included herein. However, it is believed that the utility of the microcrystalline colloidal collagen may be amply illustrated by certain representative examples of different types or classes of pharmaceutical and cosmetic compositions.

EXAMPLE 13

Two calamine preparations were prepared, one of a conventional composition identified as A, and the other similar to it but containing microcrystalline colloidal collagen, identified as B. The compositions were as follows:

|  | A | B |
|---|---|---|
|  | Parts by Weight | |
| Calamine | 5 | 5 |
| Zinc oxide | 5 | 5 |
| Glycerin | 5 | 5 |
| Water | 85 | 83 |
| Microcrystalline collagen | — | 2 |

Sample B was made by first preparing a dispersion of the microcrystalline colloidal collagen (ground hide collagen-citric acid) in the water and subsequently adding the other ingredients under strong agitation. When allowed to stand, sample A separated a supernatant liquid almost immediately, whereas sample B was stable for several hours. In appearance, sample B was superior. When portions of both samples were applied to the skin, sample B spread much more readily and uniformly and formed a very thin protective film.

EXAMPLE 14

A nasal jelly was prepared having the following composition:

| Microcrystalline collagen | 1 oz. |
|---|---|
| Water | 1 pt. |
| Isopropanol | 1 pt. |
| Menthol | 0.5 oz. |
| Camphor | 0.5 oz. |
| Eucalyptus oil | 2.5 oz. |
| Peppermint oil | 2.5 oz. |

The composition was prepared by adding ground hide collagen and citric acid to a mixture of the water and isopropanol and subjecting the mixture to attrition in a Waring Blender. The balance of the ingredients were subsequently added while continuing the agitation under slow speed until a smooth uniform jellylike mass was formed.

EXAMPLE 15

A silver iodide ointment was prepared by dissolving lanolin in isopropanol and dissolving the iodides in water. A dispersion of the microcrystalline colloidal collagen of example 13 was then formed in the salt solution and the isopropanol solution of lanolin then added to the aqueous gel while continuing the agitation. The ointment spread at least on readily as a conventional silver iodide ointment containing 98 percent lanolin but did not have the greasy feel of the conventional-type ointment. The composition of the ointment was as follows:

|  | Parts by Weight |
|---|---|
| Microcrystalline collagen | 3.00 |
| Isopropanol | 30.00 |
| Water | 60.00 |
| Anhydrous lanolin | 5.25 |
| Silver iodide | 1.50 |
| Potassium iodide | 0.25 |

EXAMPLE 16

Aspirin tablets were prepared having the following compositions:

|  | A | B |
|---|---|---|
|  | Parts by Weight | |
| Aspirin | 85.0 | 85.0 |
| Cornstarch | 14.5 | 14.5 |
| Microcrystalline collagen 1% gel | 100 | 100 |
| magnesium stearate | 0.5 | — |

In preparing the tablets, the aspirin was first milled with the cornstarch filler and subsequently wet mixed with the 1 percent gel of the type used in example 15. After forming the wet or damp mix, the mix was screened, dried and subsequently dry screened. In forming the tablets identified as A, the dry-screened material was blended with the magnesium stearate which was used as a lubricant and the mixture then tableted in the conventional manner. In forming the tablets identified as B, after dry screening, the material was formed into tablets in a conventional manner. Both types of materials has approximately the same flow properties and both forms of tablets showed substantially no dusting when placed in bottles and shaken.

EXAMPLE 17

Capsules useful as containers for measured drugs were prepared from a gel having the following composition:

|  | Parts by Weight |
|---|---|
| Microcrystalline collagen | 4 |
| Water | 70 |
| Ethanol | 24 |
| Glycerin | 2 |
| Sugar | q.s. |
| Water-soluble dye | q.s. |

In preparing the capsules, the microcrystalline collagen of the type used in example 13 was dispersed in the water to which the ethanol, glycerin, sugar and dye had previously been added. The mixture was heated and highly polished iron pins dipped into the solution and subsequently passed through a drying chamber while continuously revolving the pins. The dried capsules were subsequently removed. Two sets of pins were utilized, one having a smaller dimension so that two capsule sections would telescope to form the capsule.

EXAMPLE 18

An aerosol-type bandage composition was prepared from the following ingredients:

| Concentrate: | |  |
|---|---|---|
| Neomycin micronized | 3.5 mg./g. solids content | |
| Hydrocortisone | 2.5% solids content | |
| Vehicle: | wt.% | |
| Microcrystalline collagen | 2.0 | |
| Carbowax 600 | 0.4 | |
| Ethanol | 43.6 | |
| Water | | 50.0 |
| Fill: | | |
| Concentrate | 2.5% | |
| Vehicle | 22.5% | |
| Propellant | 75% | |

The microcrystalline collagen was dispersed in the ethanol-water mixture containing the polyoxyethylene glycol (Carbowax 600). The concentrate was then mixed into the vehicle and the liquid mass transferred to a 6 ounce Crown Spra-Tainer which is a lacquerlined can fitted with a precision valve and a standard spray actuator. The propellant was then added and the can sealed. Upon spraying, the composition provided a coating which dried to form a protective layer over the skin.

EXAMPLE 19

A hair spray was formed having the following composition:

|  | Parts by Weight |
|---|---|
| Microcrystalline collagen | 1.00 |
| Lanolin oil | 0.20 |
| Myristic alcohol | 0.20 |
| Isopropyl myristate | 0.20 |
| Perfume oil | 0.40 |
| Alcohol 74 O.P. (Over Proof) | 60.00 |
| Water | 38.00 |

In forming the mixture, the ingredients were added to the alcohol and then the alcohol mixed with the water. The microcrystalline collagen of the type used in example 13 was then added and the mixture subjected to the necessary attrition. Forty parts of the mixture were then transferred to a standard aerosol can and 60 parts of the propellant, trichlorofluoromethane-dichlorodifluoro-methane, was added and the container sealed. The spray when applied to hair provided what is commonly termed a conditioning action, achieved desired hair bodying effects and possessed the desired holding properties.

EXAMPLE 20

A conventional cleansing cream, sample A, and an identical cream containing microcrystalline colloidal collagen, sample B, were prepared, the compositions of which were as follows:

|  | A | B |
|---|---|---|
|  | Parts by Weight |  |
| Beeswax | 8.4 | 8.4 |
| Mineral oil | 25.0 | 25.0 |
| Borax | 0.4 | 0.4 |
| Water | 16.2 | 16.2 |
| Microcrystalline collagen | — | 0.25 |

Both creams had substantially the same lustrous pearly white appearance, although upon standing, water separated from cream A. Cream B remained unchanged. Both creams were easily movable over the skin. After removal from the skin by wiping with a facial tissue, cream B appeared to leave the skin with a smoother feel.

EXAMPLE 21

A greaseless hand cream was prepared from the following:

|  | Parts by Weight |
|---|---|
| Isopropyl myristate | 2.0 |
| Isopropanol | 8.0 |
| Sodium cetyl sulfate | 1.0 |
| Water | 86.5 |
| Glycerol | 1.0 |
| Microcrystalline collagen | 1.5 |

This cream was very stable on storage. It rubbed in the hands quickly and easily without "soaping" or giving a feeling of wetness. Moreover, after the application, the hands felt soft and essentially nongreasy. No impression was left on glassware, china, or metals when they were handled subsequent to the application of the cream to the ahnds.

EXAMPLE 22

An emollient cream was prepared from the following:

|  | Parts by Weight |
|---|---|
| Petroleum jelly | 10.00 |
| Mineral oil | 8.00 |
| White beeswax | 12.00 |
| Almond oil | 8.00 |
| Lanolin | 10.00 |
| Borax | 0.25 |
| Rose water | 51.00 |
| Oil of rose | q.s. |
| Microcrystalline collagen | 0.75 |

This cream was rich. It spread easily without dragging or slipping excessively, and appeared to be slowly absorbed by the skin during application. When applied to sore, chapped skin, it had a smoothing effect and immediately relieved the feeling of dryness.

EXAMPLE 23

A hand lotion was made up comprising:

|  | Parts by Weight |
|---|---|
| Glycerine | 40 |
| Distilled water | 47 |
| Ethyl alcohol | 10 |
| Oil of peppermint | 2 |
| Sodium lauryl sulfate | q.s. |
| Microcrystalline collagen | 1 |

The lotion was viscous but readily pourable and had a lustrous pearly white appearance. It rubbed smoothly over the hand, giving the impression of lubricity without greasiness; on drying the applied coating, no visible trace of microcrystalline collagen was apparent.

EXAMPLE 24

A nongreasy-type sunscreen-type cream was prepared from the following:

|  | Parts by Weight |
|---|---|
| Microcrystalline collagen | 1.0 |
| Cetyl alcohol | 0.5 |
| Stearic acid | 5.0 |
| Ethyl p-aminobenzoate | 1.2 |
| Isopropanol | 5.0 |
| Water | 86.0 |
| Glycerol | 1.3 |

The cream spread to a nongreasy, uniform, and occlusive film that gave good protection against radiant energy.

EXAMPLE 25

A brushless shaving cream was prepared from the following:

|  | Parts by Weight |
|---|---|
| Microcrystalline collagen | 1 |
| Triethanolamine | 1 |
| Oleic acid | 2 |
| Sodium lauryl sulfate | q.s. |
| Water | 50 |

The ingredients were all thoroughly mixed together in a Waring Blender to produce a cream which was placed in a jar and capped. It had a light, wet appearance resembling conventional brushless-type shaving cream and and a pleasant odor. The preparation had a slippery, creamy feel on the skin without being greasy. It was used as a brushless shaving cream sn retained its moist condition during the entire shaving period.

EXAMPLE 26

The following toothpaste was prepared:

|  | Parts by Weight |
|---|---|
| Precipitated chalk | 35.0 |
| Tricalcium phosphate | 7.0 |
| Microcrystalline collagen | 2.5 |
| Foaming agent | 5.0 |
| Gum Karaya | 0.3 |
| Saccharin | 0.5 |
| Glycerin | 12.0 |
| Water | 37.7 |

The mixture was prepared in a Waring Blender and was packaged in conventional tubes. An outstanding feature of this paste is that it did not dry out when the tube was left without the cap.

EXAMPLE 27

An antiperspirant composition was prepared containing:

| | Parts by Weight |
|---|---|
| Stearic acid | 15.5 |
| Microcrystalline collagen | 1.0 |
| Sodium lauryl sulfate | 1.5 |
| Propylene glycol | 5.0 |
| Water | 54.0 |
| Urea | 5.0 |
| Aluminum sulfate | 18.0 |

In formulating, two mixtures were prepared, one containing microcrystalline collagen and the stearic acid, and the other comprising the balance of the ingredients. Each mixture was heated to 70° C. and then mixed. The resulting product was in the form of a paste that was easily spreadable over the skin and had a nongreasy feel.

In the foregoing examples of pharmaceutical and cosmetic compositions, the microcrystalline colloidal collagen was a powdered or finely ground hide which had been treated with citric acid. In preparing the powdered material, hide collagen was treated with a citric acid solution having a pH of about 2.3 and attriting the mixture in a Waring Blender. The resulting gel was freeze dried and the freeze-dried product finely ground to provide the powdered material. Alternatively, where the mixing step in the preparation of the pharmaceutical or cosmetic composition involves an attrition step, a mixture of finely ground hide collagen and the required amount of citric acid may be used and the microcrystalline colloidal collagen is formed during the attrition step.

In the foodstuffs, pharmaceutical compositions and cosmetic compositions, the food, pharmaceutical and cosmetic ingredient or ingredients must be compatible with microcrystalline colloidal collagen, are present in the compositions in an available form and in an amount sufficient so as to impart the characteristic food, therapeutic or cosmetic effect. The microcrystalline colloidal collagen in these compositions is indistinguishable but imparts the enhanced properties to the compositions as discussed hereinbefore.

As stated hereinbefore, during the acid treatment of the collagen, the ionizable acid reacts only with the available amino groups to form a water-insoluble salt of collagen. Some of the amino groups are within the crystallites and are hydrogen bonded to each other within the collagen and thus are not accessible to the treating acid. The term "water-insoluble, ionizable salt of collagen" is used herein and in the claims to designate this reaction The the water-insoluble, ionizable salts of collagen are unique in their characteristic of forming aqueous gels containing one-half percent dispersed slat having a pH between about 3.2 ±0.2, the gels having a substantially stable viscosity for at least 100 hours at 5° C. when stored in a closed container. Normally, the new physical form of the microcrystalline colloidal particles comprising bundles of aggregated tropocollagen units will have diameters of at least about 25 A. and lengths of from about that of the tropocollagen unit (3,000 A.) to just under 1 micron. Colloidal particles having these diameters but of lengths considerably less than that of the tropocollagen unit may be obtained by very severe and prolonged attrition whereby bundles become severed transversely.

Various changes and modifications may be made in practicing the invention without departing from the spirit and scope thereof and, therefore, the invention is not to be limited except as defined in the appended claims.

I claim:

1. A food composition comprising a mixture of a food material and a water-insoluble, ionizable, partial salt of collagen having a bound ionizable acid content of from about 0.4 to about 0.7 millimole of acid (calculated as HCl per gram of collagen based upon collagen containing approximately 0.78 millimole of primary amino groups per gram of collagen, being substantially free of tropocollagen and degraded derivatives thereof and being further characterized in that when colloidally dispersed in water to form a one-half percent by weight gel wherein at least 10 percent by weight of the partial salt has a particle size under 1 micron, the gel exhibits a pH of about 3.2 ±0.2, the food material being compatible with the partial salt of collagen and being present in an amount sufficient to impart its characteristics of the composition.

2. A food composition as defined in claim 1 wherein the water-insoluble, ionizable, partial salt of collagen is a hydrogen chloride salt of collagen derived from cowhide.

3. A food composition as defined in claim 1 wherein at least 10 percent by weight of the water-insoluble, ionizable, partial salt of collagen consists of bundles of aggregated tropocollagen units, each of the bundles having a minimum diameter of about 25 A. and having a maximum particle size not exceeding 1 micron.

4. A food composition as defined in claim 2 wherein the water-insoluble, ionizable, partial salt of collagen is a hydrogen chloride salt of collagen derived from cowhide.

5. A food composition as defined in claim 1 wherein the food material includes an edible aqueous liquid.

6. A food composition as defined in claim 5 wherein the composition is in a frozen state.

* * * * *

UNITED STATES PATENT OFFICE
CERTIFICATE OF CORRECTION

Patent No. 3,632,350          Dated January 4, 1972

Inventor(s) Orlando A. Battista

It is certified that error appears in the above-identified patent and that said Letters Patent are hereby corrected as shown below:

Column 1, line 48 "tons" should read --tens--.

Column 1, line 74 "water-mincible" should read --water-miscible--.

Column 3, line 39 "case" should read --ease of--.

Column 3, line 64 "tropocollngen" should read --tropocollagen--.

Column 4, line 48 "Kase" should read --Ease--.

Column 5, line 51 "25 C." should read --25°C.--.

Column 5, line 51 "HDT" should read --HBT--.

Column 7, line 15 "phenomens" should read --phenomena--.

Column 7, line 19 "viscosition" should read --viscosities--.

Column 7, line 46 "-**°C.," should read -- -50°C.,--.

UNITED STATES PATENT OFFICE
CERTIFICATE OF CORRECTION

Patent No. 3,632,350                    Dated January 4, 1972

Inventor(s) Orlando A. Battista                  - 2 -

It is certified that error appears in the above-identified patent and that said Letters Patent are hereby corrected as shown below:

Column 8, line 1 "HCl" should read --HCl)--.

Column 8, line 29 "an" should read --as--.

Column 8, line 38 "an" should read --as--.

Column 9, line 26 "e" should read --be--.

Column 11, line 42 "3" should read --3%--.

Column 11, lines 52-53 "The dried material after attriting freeze drying the dispersion." should be omitted.

Column 11, line 63 "grandular" should read --granular--.

Column 12, line 43, "in" should read --is--.

Column 12, line 57 "The" should read --on--.

Column 12, lines 65-66 "because of the excellent adherence when applied to the skin of the user" should be omitted.

UNITED STATES PATENT OFFICE
CERTIFICATE OF CORRECTION

Patent No. 3,632,350           Dated January 4, 1972

Inventor(s) Orlando A. Battista           - 3 -

It is certified that error appears in the above-identified patent and that said Letters Patent are hereby corrected as shown below:

Column 15, line 28 "scaled" should read --sealed--.

Column 15, line 69 "ahnds" should read --hands--.

Column 16, lines 44-48 "cEXAMPLE 25" should read --c-- should be omitted --EXAMPLE 25-- should be centered.

Column 16, line 61 "sn" should read --and--.

Column 18, line 2 "reaction" should read --reaction product.--.

Column 18, line 2 "the" should be omitted.

Column 18, claim 1, line 24 "HCl" should read --HCl)--.

Column 18, claim 4, line 44 "claim 2" should read --claim 3--.

Signed and sealed this 1st day of May 1973.

(SEAL)
Attest:

EDWARD M. FLETCHER, JR.           ROBERT GOTTSCHALK
Attesting Officer                 Commissioner of Patents